May 19, 1970 P. M. ELLIOTT 3,513,278
ALTERNATE ACTION MECHANISM
Filed Nov. 24, 1967 2 Sheets-Sheet 1

INVENTOR.
Phillip M. Elliott
BY
His Att'ys

May 19, 1970 P. M. ELLIOTT 3,513,278
ALTERNATE ACTION MECHANISM
Filed Nov. 24, 1967 2 Sheets-Sheet 2

INVENTOR.
Phillip M. Elliott
BY
His Att'ys

United States Patent Office 3,513,278
Patented May 19, 1970

3,513,278
ALTERNATE ACTION MECHANISM
Phillip M. Elliott, Schiller Park, Ill., assignor to Illinois Tool Works Inc., Chicago, Ill., a corporation of Delaware
Filed Nov. 24, 1967, Ser. No. 685,701
Int. Cl. H01h 19/14
U.S. Cl. 200—156                                 8 Claims

ABSTRACT OF THE DISCLOSURE

An alternate action meachanism for a control device, such as a switch, wherein a toothed ratchet member and a lobed cam member are mounted for rotation in unison and wherein a depressor, such as a push button, is movable between actuating and non-actuating positions and carries a flexible pawl member in normal position to engage a ratchet tooth for rotating the ratchet and cam members a given increment upon depression thereof to actuating position with permissive flexing of the pawl member out of engagement with the previously engaged ratchet tooth upon overtravel of the depressor without further rotation of the ratchet and cam members beyond the given increment of rotation, and wherein the cam member depresses a lever actuator for the control device or switch and maintains the depressed position of the lever upon return of the depressor to its initial non-actuating position without distributing the previous rotated position of the ratchet and cam members.

---

This invention relates to new and useful improvements in control devices, such as switches, and more particularly to improvements in an alternate action mechanism for actuating such a control device and maintaining the same in either of two positions when operated. Such alternate action mechanisms provide alternate operation of a switch or control device upon successive actuations of an operator, such as a plunger, push button or the like.

An object of the present invention is to provide an alternate action mechanism having releasable mechanical actuating and locking connections to actuate the control device to one position and to lock the control device in that actuated position when the operator is moved in one directon but which actuating connection is disabled from its actuating function upon return movement of the operator to an initial position while the locking connection retains its locking function until the operator is again moved from its initial position.

Another object of this invention is to provide an alternate action mechanism including a pawl and ratchet member wherein the mechanical actuating connection is provided by a pawl engaging ratchet tooth upon movement of the operator in one direction to advance the ratchet member a given increment of rotation and wherein the pawl recedes past adjacent ratchet teeth upon return movement of the operator without disturbing the previously advanced position of the ratchet member.

A further object of the inevntion is to provide an improved pawl and ratchet type of alternate action mechanism of the above type wherein the possibility of damage to parts by excessive movement of the operator is largely eliminated by permitting the pawl to override the ratchet member after its initial increment of rotation without causing further rotation of the ratchet member in instances where the depressor may have this additional permissive movement in a full stroke thereof.

A still further object of the invention is to provide a cam member in association with the ratchet member and operating through a lever arm to effect initial movement of the control deivce or switch to a first position wherein the lever arm and the cam member mutually cooperate to provide a positive lock against return movement of the control device or switch when the operator returns to its initial position for further actuation.

A still further object of the invention is to provide an alternate action mechanism substantially of the above type wherein the ratchet and cam members are combined to rotate in unison on a common axis and wherein the pawl is flexed to override an engaged ratchet tooth when the initial increment of rotation of the ratchet and cam members is reached to thus provide for overtravel of the operator.

The invention still further aims to provide an alternate action mechanism substantially of the above type which is relatively inexpensive to manufacture; which provides positive mechanical operation in one direction of movement of the operator; and which is of relatively simple design for trouble free operation.

The above and other objects of the invention will in part be obvious and will be hereinafter more fully pointed out.

Figure 1:
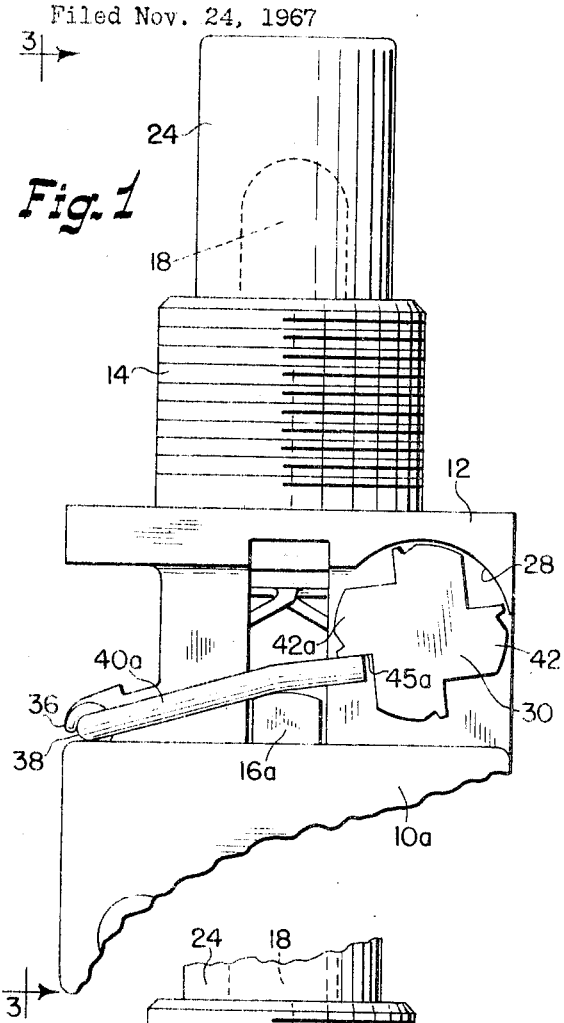
FIG. 1 is a side elevation showing the cam member, lever arm and switch button in initial position.
Figure 2:
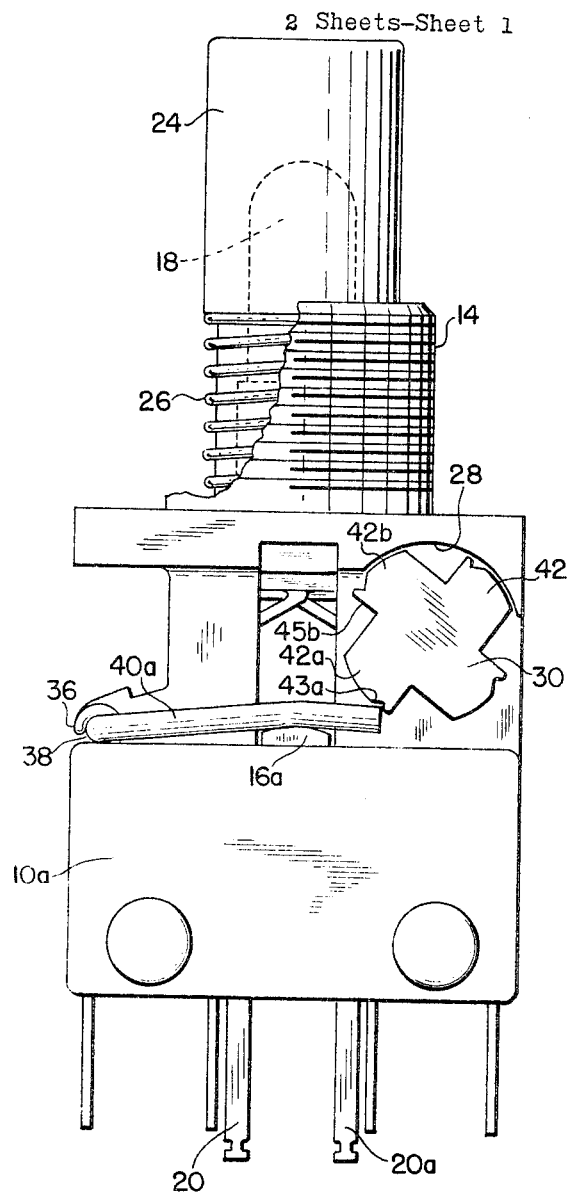
FIG. 2 is a similar side elevation showing the position of the parts in switch button actuated position.
Figure 3:
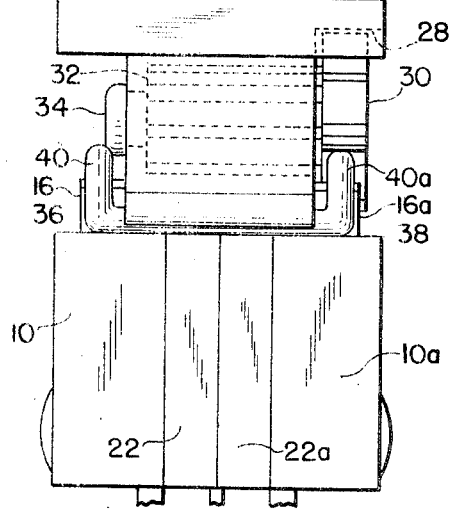
FIG. 3 is an end elevation of FIGS. 1 and 2.

With reference to FIGS. 1, 2 and 3 of the accompanying drawings, a pair of miniature switches 10, 10a of known construction are shown in association with a housing 12 having a threaded tubular extension 14 for mounting purposes. The switches 10, 10a include outwardly biased switch buttons 16, 16a. Within the tubular extension 14 there is mounted a lightbulb 18 having terminals 20, 20a extending between depending portions 22, 22a of the housing 12 and which portions are sandwiched between the two switches, as shown in FIG. 3, and secured together by rivets or the like, thus securing together the housing and switches. The tubular extension also receives a depressor 24 in the form of a push button or plunger, which is biased by spring 26 to an outward non-actuating position. The mounting of the depressor may be essentially as shown in the co-pending application of George J. Bury, Ser. No. 619,821, filed Mar. 1, 1967, and entitled "Lighted Push Button Switch Assembly."

The housing is recessed near one end thereof, as at 28 to receive and provide a guide surface for a multi-lobed cam member 30. Also, the housing is internally recessed inwardly of the recess 28 to receive a toothed ratchet member 32 (see FIGS. 4, 5 and 6) formed integral with the cam member for rotation on a common axis in unison. The opposite end of the cam member and ratchet member assembly is provided with a button-like fastener 34 which engages the adjacent outer surface of the housing 12 to serve as a mounting means therefor and preventing endwise movement thereof.

At the opposite end of the housing 12 and adjacent the surface of the switches, there is provided a hook-like keeper formation 36 which receives and pivotally mounts the bite portion 38 of a U-shaped actuating lever having lever arms 40, 40a, with intermediate portions overlying the switch buttons, 16, 16a, respectively, for depressing the same when the lever arms are depressed. The free end portions of the lever arms project into the path of movement of the cam member 30.

The cam member 30 is illustrated as being provided with four identical lobe portions, but it is to be understood that the number of such lobe portions on the cam member may be varied in accordance with the particular strokes of the depressor and the switch buttons of the switches selected for any installation. Each cam lobe is identified by the numeral 42 or with added suffix *a* or *b* where specific reference is made thereto. Each lobe has an identical notch designated by the numeral 43 or with added suffix *a* or *b* where reference is made specifically thereto. Further, each lobe includes a radial face designated by the numeral 45 or with added suffix *a* or *b*. In the position of FIG. 1, the switch button 16a is biased to its outward position where the upper surface of the free end of the lever arm 40a is in engagement with the radial surface 45a of the cam lobe 42a. In the position of FIG. 2, the lever arm 40a has been depressed to correspondingly depress the switch button 16a to its inward position and the end of the lever arm 40a is now trapped in the notch 43a of the cam lobe 42a.

Figure 4:
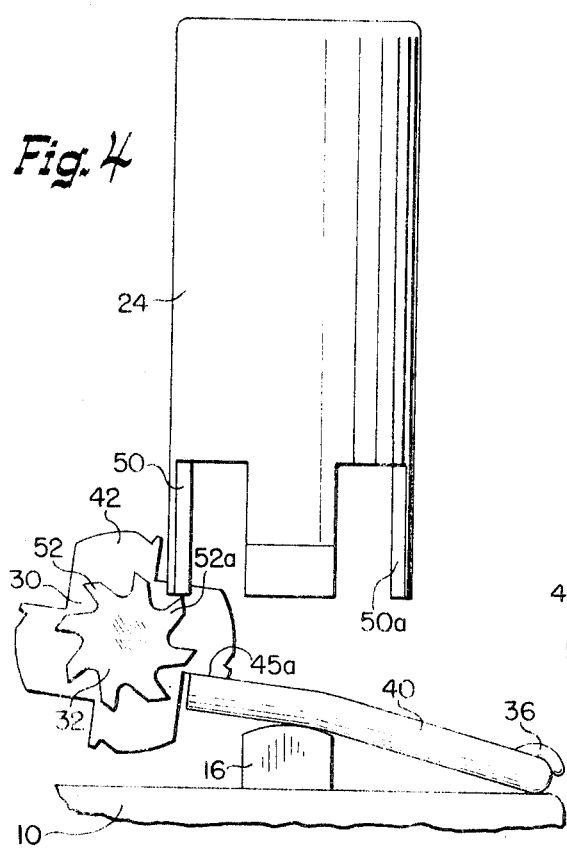
FIG. 4 is a fragmentary side elevation opposite to that of FIG. 1 with the housing removed for clarity in showing the position of the pawl and ratchet member in initial position.
Figure 5:
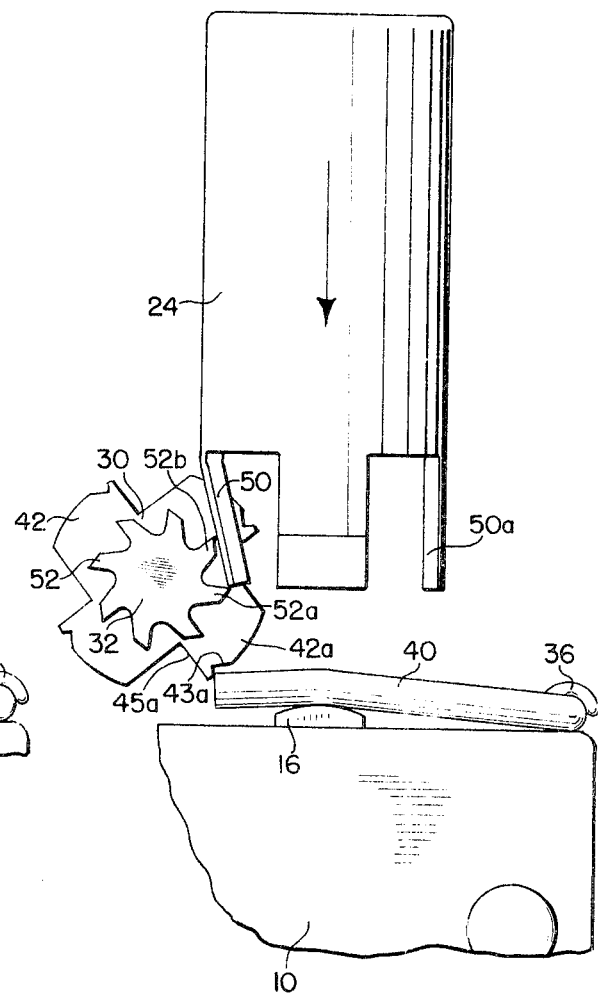
FIG. 5 is a side elevation similar to FIG. 4 showing the position of the pawl and ratchet member in switch button actuated position corresponding to that of FIG. 2.
Figure 6:
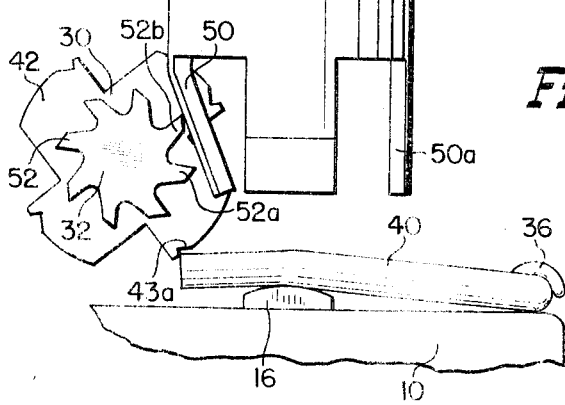
FIG. 6 is a view similar to FIG. 5 and showing permissive overtravel of the operator and pawl.

The above incremental rotation of the cam member 30 is affected by a pawl and ratchet mechanism and reference in this connection is made to FIGS. 4, 5 and 6 in which the housing has been omitted for clarity and where the rotation of the cam member will appear as clockwise with the ratchet member 32. The depressor or push button 24 includes at least a pair of pawls 50, 50a depending therefrom and each being flexible for purposes to be hereinafter pointed out. The push button is positioned in the tubular extensions 14 of the housing with one or another of the pawls positioned wtih respect to ratchet member 32 for an initial operating stroke of the push button. As illustrated, the pawl 50 is so positioned. The ratchet member includes ratchet teeth designated by the numeral 52 or with added suffix *a* or *b*. In the position of FIG. 4, the pawl 50 is in initial engagement with the ratchet tooth 52a. Likewise, the end of the lever arm 40a, as pointed out in connection with FIGS. 1 and 2, is in engagement with the radial surface 45a of the cam lobe 42a. In the position of FIG. 5, the push button 24 has been depressed substantially to the predetermined limit of the desired incremental rotation of the cam and ratchet members with the trailing ratchet tooth 52b having engaged an intermediate portion of the pawl 50 and flexed the same inwardly to a position where it is about to clear the end of the ratchet tooth 52a. In this position, the lever arm 40a has cleared the lever actuating surface 45a of the cam lobe and snaps into the notch 43a as pointed out in connection with the previously described position of FIG. 2 so that the engaged cam lobe notch and lever arm cooperate to hold the same in this position with the switch button 16 repressed to its inward position.

From the position of FIG. 5, there may be overtravel of the push button 24 and one such position of overtravel is illustrated in FIG. 6. The end of the pawl 50 has cleared the ratchet tooth 52a by slight additional inward flexing under influence of the ratchet tooth 52b. This overtravel of the push button does not advance the previous incremental rotation of the cam and ratchet members. Reverse movement of the push button 24 to the initial non-actuating position thereof, as in FIGS. 1 and 4, under influence of the spring 26 enables the pawl 50 to resume its straight strut-like position for engagement with a next trailing ratchet tooth. In such reset position, further depression of the push button will advance the trailing ratchet tooth along with the cam member so that the previously engaged cam lobe 42a will wipe over the surface of the free end of the lever arm and permit its return to the position of FIG. 4 under the biasing action of the switch button 16 and then into engagement with a trailing radial actuating surface on the next following cam lobe. It is, of course, understood that the above-described actuation of the push button to effect depression of lever arm 40a will also effect simultaneous depression of the lever arm 40 through the connecting bite portion 38 and thus operation of the other switch button 16. As the pawl 50 is flexed inwardly to either the positions of FIGS. 5 or 6, there is insufficient force to advance the ratchet and cam members, but there is a residual storage of spring energy in the flexible pawl which will assist as a vertical vector force in returning the pawl and push button to initial non-actuating position. Further, it is to be noted that the push buttons are constantly biased into engagement with the lever arms with the lever arm 40a in constant engagement with some portion of the cam lobes and this serves to maintain proper orientation of the axis of rotation of the unitary cam and ratchet members, together with the securing button 34 at the opposite end of the housing 12.

Briefly, operation is as follows:

Depression of the push button 24 from the position of FIG. 1 or 4 causes the pawl 50 to engage a ratchet tooth and rotate the ratchet member and the cam member in unison a predetermined increment of rotation to the position shown in FIG. 2 or 5. In such depressed position, the lever arms have been depressed to force the switch buttons to their inward positions. The lever arm 40a is engaged in the notch 43a in the nature of a locked toggle connection to hold the parts in that position as the push button 24 is returned under spring action to its initial position. It is again pointed out that there is permissive overtravel of the push button to a position somewhat as shown in FIG. 6 where a following ratchet tooth 52b has flexed the pawl 50 inwardly to clear the previously engaged ratchet tooth 52a. On a succeeding depression of the switch button, the railing ratchet tooth 52b is engaged by the pawl 50 to advance the ratchet member and the cam member in unison another increment of rotation. During this increment of rotation, the previous toggle-like engagement between the cam lobe 42a and the lever 40a is broken and will be released with the curved surface of the lobe 42a wiping over the end of the lever 40a and clearing the same to permit the lever arms to be returned under the biasing action of the switch buttons to the position of FIG. 1 or 4 where the upper surface of the end portion of the lever arm 40a is in engagement with a trailing actuating surface 45b of the next following cam lobe 42b. Thus, the switch buttons 16, 16a are free to be biased to the outward positions thereof and return the lever arms to elevated positions.

While one form of the invention has been shown for purposes of illustration, it is to be clearly understood that various changes in the details of construction and arrangement of parts may be made without departing from the spirit and scope of the invention as set forth in the appended claims.

What I claim is:

1. An alternate action mechanism comprising a depressor which is biased outwards from the outer end of within the mechanism, a lever arm pivotally mounted at the mechanism, a multilobed cam rotatably mounted the inner end of the mechanism, with the free end of the arm following the cam, the mechanism including ratchet means responsive to inward movement of the depressor to impart to the cam a particular incremental rotation, the cam and the lever arm being arranged so that the lever arm is alternately moved inwards, then outwards, by the successive incremental rotations of the cam, and a holding means comprising a notch on each of the cam lobes formed to engage and hold the tip end of the lever arm in its inward position, whereby the inward position of the lever is maintained and held against retrograde movement despite the immediately following outward movement of the depressor.

2. A mechanism according to claim 1 wherein said ratchet means comprises a rotatably mounted toothed ratchet, and a flexible pawl carried by the depressor with the free end of the pawl in a position to engage a ratchet tooth to impart a particular incremental rotation to the ratchet on movement of the depressor to the actuating position.

3. A mechanism according to claim 2 and further comprising means for engaging and flexing the pawl to a position with the free end of the pawl by-passing the previously engaged ratchet tooth at the end of an incremental rotation of the ratchet to permit overtravel of the depressor and the pawl without further rotation of the ratchet.

4. A mechanism as claimed in claim 3 in which the ratchet has peripherally spaced projections, each projection trailing a previously engaged ratchet tooth and being disposed to engage and laterally deflect the pawl to the position in which the free end thereof leaves the previously engaged ratchet tooth.

5. A mechanism according to claim 4 in which each ratchet tooth trailing a previously engaged identical ratchet tooth constitutes the projection for that tooth, and engages and laterally deflects the pawl.

6. A mechanism according to claim 1 in which the lever arm is one arm of a U-shaped member, both arms of which simultaneously move in the same direction in response to rotation of the cam.

7. A mechanism according to claim 2 in which the depressor has at least two pawls, so permitting assembly of the depressor in more than one operative position with respect to the ratchet member.

8. A mechanism according to claim 2 and comprising a housing in an outer open end of which the depressor is removably mounted, the housing carrying the cam member and the lever arm and there being a means for fastening the housing to a switch mechanism.

References Cited

UNITED STATES PATENTS

| 2,928,920 | 3/1960 | Lewis et al. | 200—156 |
| 2,933,578 | 4/1960 | Hubbell et al. | 200—156 |
| 3,045,501 | 7/1962 | Wright | 200—156 X |
| 3,136,167 | 6/1964 | Morner | 74—575 X |
| 3,300,611 | 1/1967 | Bury | 200—156 |

FOREIGN PATENTS 668,323  10/1929  France.

ROBERT K. SCHAEFER, Primary Examiner

R. A. VANDERHYE, Assistant Examiner

U.S. Cl. X.R.

74—575

PO-1050
(5/69)

UNITED STATES PATENT OFFICE
CERTIFICATE OF CORRECTION

Patent No. 3,513,278　　　　　　　　　　Dated　May 19, 1970

Inventor(s)　P. M. Elliott

It is certified that error appears in the above-identified patent and that said Letters Patent are hereby corrected as shown below:

Claim 1, line 3, change "within the mechanism, a lever arm pivotally mounted at" to -- the mechanism, a multilobed cam rotatably mounted --.

Claim 1, line 4, change "the mechanism, a multilobed cam rotatably mounted" to -- within the mechanism, a lever arm pivotally mounted at --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents